Figure 1:
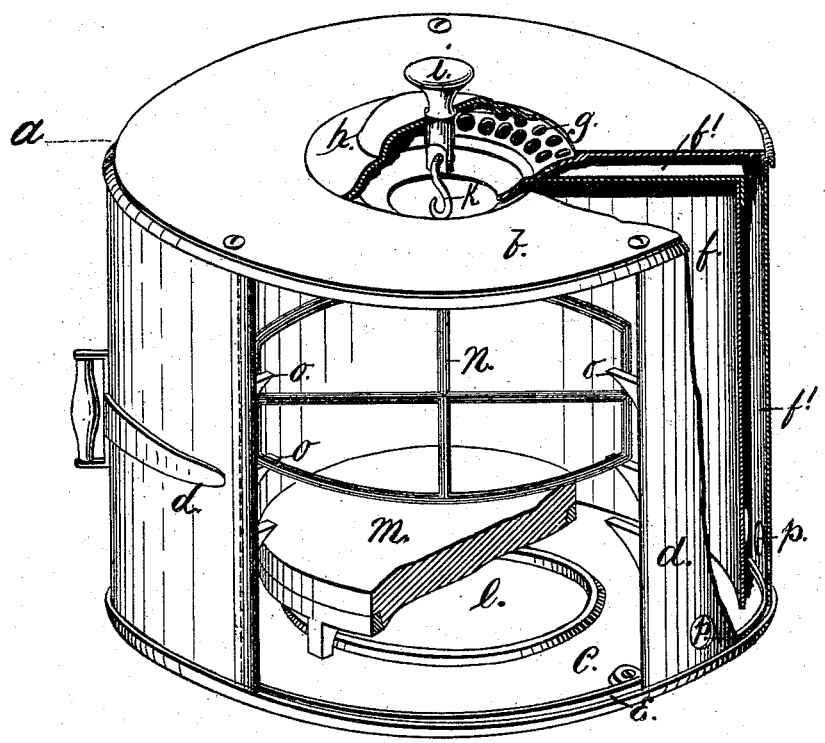

J. R. SHIRLEY.
OVEN FOR GAS STOVES.

No. 177,966. Patented May 30, 1876.

WITNESSES.
L. P. Langworthy.
R. W. Eaton.

INVENTOR.
John R. Shirley
by Joseph A. Miller
Attorney.

UNITED STATES PATENT OFFICE.

JOHN R. SHIRLEY, OF PROVIDENCE, RHODE ISLAND.

IMPROVEMENT IN OVENS FOR GAS-STOVES.

Specification forming part of Letters Patent No. 177,966, dated May 30, 1876; application filed April 25, 1876.

*To all whom it may concern:*

Be it known that I, JOHN R. SHIRLEY, of the city of Providence, and State of Rhode Island, have invented new and useful Improvements in Ovens for Gas-Stoves; and I do hereby declare that the following is a full, clear, and exact description of the same, reference being had to the accompanying drawings forming part of this specification.

Figure 1 is a perspective view of my improved oven for gas-stoves. Parts are shown as cut away to show the arrangement of circulating flue, and also the hole in the top, the cover, and the suspended hook.

The invention has reference to an oven arranged to be placed over the burner of a gas-stove, and in which articles of food may be roasted or baked. It consists in a vertical cylindrical oven, provided with a sliding door, an adjustable rack, a double wall arranged for the circulation of the heat, a deflector, and a cover, the whole arranged to cook, roast, or bake meat, bread, or other food, as will be more fully set forth hereinafter.

$a$ is a cylindrical sheet-metal oven provided with the top $b$ and bottom C. $d$ is the door sliding in the groove E made in the top and bottom plate. By means of this sliding door the oven can be opened and closed with more facility than can be done with hinged doors, while the door will not be in the way, and the oven will not take up as much room on a gas-stove, as the door will not interfere with other contiguous articles. Hinged doors must be secured by latches to make them tight, but my sliding door does not require such latches, and can be readily opened or closed when hot, as no part need be touched by the hand. This sliding door will stand in any position placed, and is not liable to swing against the hand, as is the case with the ordinary hinged door. $f f$ is the interior lining or casing of the oven, made preferably of bright metal, and arranged to form a space between the inner and outer casing, both on top and at the side of the oven, through which the heat is made to circulate, thus forming a descending flue for the waste products of combustion. The space $f'$ communicates with the upper part of the oven by means of the holes $g g$, and with the outer air near the bottom of the holes $p p$, so that the heat, after rising to the top of the oven, must descend through the space $f'$ before the same can escape by the holes $p p$. By these means the heat is retained in the oven, and only the cooler gases are allowed to escape. The hole in the top of the oven and the top itself can be used to heat a second vessel without interfering with the roasting or baking in the oven. $h$ is a cover, by which the hole in the top of the oven can be closed. It is provided with the knob $i$, and also with a hook, $k$, from which meat may be suspended over a pan, and the heat may thus freely surround the same, roasting the meat more thoroughly than when lying in the pan. $l$ is the hole in the bottom of the oven where the heat from the gas-stove enters the same. $m$ is the deflector, made of soap-stone, fire-brick, or of a combination of iron with soap-stone or fire-brick. It serves to deflect the heat or flame from the gas-stove from the bottom of the pan, and causes it to be distributed more evenly through all parts of the oven. $n$ is the rack on which the pans containing the articles to be roasted or baked are placed. The racks can be adjusted on any of the projections $o o$ to suit the dimensions or nature of the articles to be cooked, roasted, or baked.

This oven being cylindrical, or of the usual shape of the gas-stoves, will set more firmly on the same, and is not liable to be upset, as it can be made of considerable height at a mere nominal increase in cost. It will occupy little room, and have a larger capacity than ovens as heretofore made.

It can be constructed more cheaply, is more convenient in use, and is adapted to cook, roast, or bake more evenly and thoroughly than ovens of other form or construction.

Having thus described my invention, I claim as new and desire to secure by Letters Patent—

1. The combination, with the cylindrical gas-stove oven, of the interior casing $f$, the holes or openings $g g$ and $p p$, arranged as described, to insure the circulation of the heat through the space $f'$, substantially as and for the purpose specified.

2. The combination, with a cylindrical gas-stove oven, of the hole $l$ in the bottom, and a corresponding hole in the top, arranged as described, so that a vessel may be placed in the hole, and the heat, before entering the space $f'$, will be utilized by the same, as and for the purpose described.

3. The combination, with the cylindrical gas-stove oven, provided with an opening at its top, of the cover $h$, provided with the hook $k$, arranged to suspend meat therefrom, substantially as for the purpose set forth.

4. The combination, with a cylindrical gas-stove oven, provided with the sliding door $d$, extending from the bottom to the top plate, of the adjustable rack $n$ and supports $o$ $o$, formed on the bars, by which the top and bottom plates are secured together, substantially as and for the purpose specified.

JOHN R. SHIRLEY.

Witnesses:
JOSEPH A. MILLER,
G. B. BARROWS.